United States Patent [19]

Wiegand

[11] 4,173,253

[45] Nov. 6, 1979

[54] SOLAR RADIATION COLLECTOR AND WATER COOLER

[75] Inventor: James B. Wiegand, Longmont, Colo.

[73] Assignee: Solar Energy Research Corp., Longmont, Colo.

[21] Appl. No.: 890,640

[22] Filed: Mar. 20, 1978

Related U.S. Application Data

[63] Continuation-in-part of Ser. No. 759,762, Jan. 17, 1977, Pat. No. 4,111,187.

[51] Int. Cl.² ............................................. F25B 29/00
[52] U.S. Cl. .................................... 165/48 S; 62/305;
62/314; 126/432; 165/63
[58] Field of Search ................. 165/48 S, 63; 62/305,
62/314; 126/271

[56] References Cited

U.S. PATENT DOCUMENTS 3,957,109 5/1976 Worthington ........................ 165/48
4,003,365 1/1977 Wiegand et al. ..................... 126/271

Primary Examiner—Albert W. Davis, Jr.
Assistant Examiner—Margaret A. Focarino
Attorney, Agent, or Firm—Frank C. Lowe

[57] ABSTRACT

The basic structure is a solar radiation collector of the type having an enclosed cavity. A spray of water in this cavity is directed against a solar absorption sheet to heat the water. This structure may be used as a cooler by directing a flow of air through the cavity.

12 Claims, 7 Drawing Figures

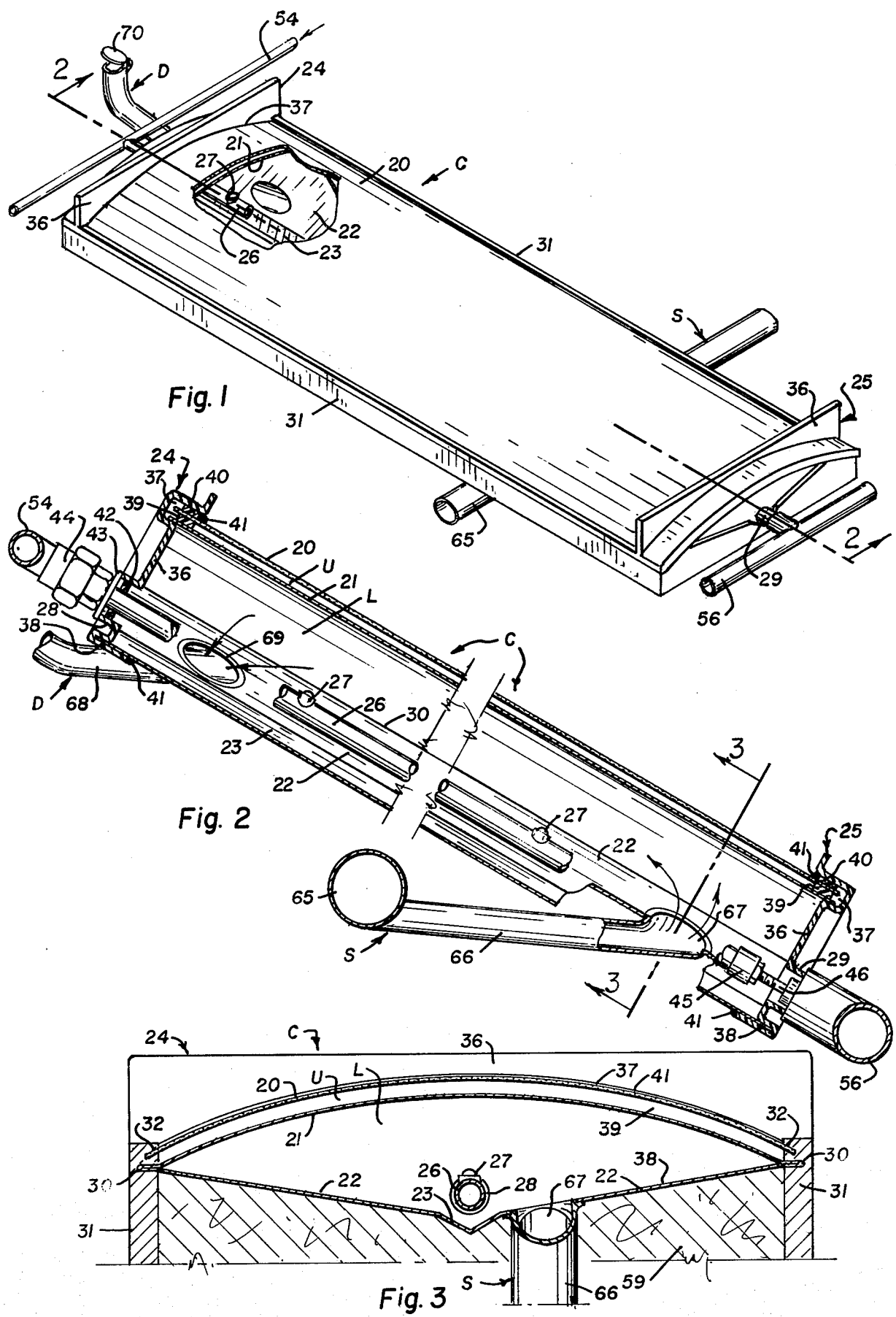

SOLAR RADIATION COLLECTOR AND WATER COOLER

The present invention is a continuation-in-part of my application for a Modular Solar Radiation Collector, field Jan. 17, 1977, Serial No. 759,762, now issued as patent No. 4,111,187, which was a development from my original patent No. 4,003,365, issued Jan. 18, 1977.

The present invention relates to apparatus for collecting solar radiation energy to convert the same to heat and more particularly to a collector of the type which heats water. The essential feature of the present invention is, however, a solar collector which not only heats water, but also can cool water. As such, the invention will be called a solar radiation collector and water cooler.

The essential feature of the invention disclosed in my original patent, U.S. Pat. No. 4,003,365, is an enclosed structure having an inclined solar wall at one side of the structure. This solar wall includes a transparent solar transmission membrane overlying an absorption membrane. The absorption membrane receives and absorbs the heat energy of the sun's rays. A spray of water within the structure strikes the undersurface of the absorption membrane to pick up the heat generated at the absorption membrane. The heated water then falls into a trough at the base of the structure to flow therefrom for storage or use.

The improved modular solar radiation collector described in the application, Ser. No. 759,762, uses the principle set forth in the patent, U.S. Pat. No. 4,003,365. The modular unit is an elongated, box-like member and it is adapted to be mounted to slope, longitudinally, facing south and preferably at an inclination which will most effectively receive solar radiation. A group of such units may be mounted side by side upon the roof or wall of a building or other suitable structure. Each modular unit includes an upper radiation transmission sheet, or surface, an intermediate radiation absorption sheet, or surface, and a lower sheet, a trough-shaped drainage pan. The drainage pan is spaced below the radiation absorption sheet a distance sufficient to provide a cavity large enough to accommodate a longitudinal water supply pipe having nozzles to spray water against the underside of the intermediate heat absorption sheet. In operation, the spray water is thereby heated and then falls onto the drainage pan to flow to the lower end of the modular unit and thence through a conduit to a storage tank or other use facility.

In field installations a number of such modular collector units have been used with commercial heat pumps which can effectively concentrate the heat energy provided by the collector units. A heat pump compresses a refrigerant gas which then becomes hot. A suitable heat exchanger, combined with a circulating fluid system, effects cooling of the hot refrigerant gas and at the same time heats the fluid of the system. The heated fluid is then transported to a service radiator or the like. The refrigerant gas is then permitted to expand and a significant drop in temperature occurs. The heated water generated by the solar radiation collectors warms this cold gas to increase its heat content before it is again compressed to repeat the cycles.

An advantage of the heat pump resides in the fact that it can be reversed. The heat exchanger is then associated with that section of the heat pump where the refrigerant gas has expanded and is cold. The fluid in the heat exchanger is thus cooled and cooled fluid flows to the service radiator. For good efficiency in the cooling operation of the heat pump, the hot compressed refrigerant gas must be cooled before it is allowed to expand. A flow of cold water, as through a suitable heat exchanger, is the usual way to cool the hot compressed gas. The cold water may be from any suitable source, such as from a well or from a cooling tower.

In a large part of the United States, and elsewhere, as in the south, midwest and west, the summers are unbearably hot and the winters can be very cold. In such locations it is necessary to cool a house in the summer and to warm the house in the winter. A heating-cooling system using a heat pump is ideally suited to function both ways. The conventional arrangement is to provide cool water to facilitate operation of the heat pump in the summer and to provide hot water to facilitate operation of the heat pump in the winter. The cool water is usually from a cooling tower. The hot water may be from a solar energy collector system, such as heretofore described.

A primary objection to this system is the expense of building and installing a cooling tower. The other components are expensive enough, but the added expense of a cooling tower prevents the system from being competitive with other competitive heating and cooling systems on the market even though the use of a two-way heat pump provides for advantages not otherwise available.

The present invention was conceived and developed because of the foregoing considerations and the invention comprises, in essence, a modular solar radiation collector of the general type which provides a cavity beneath the heat absorption sheet and wherein a spray of water is directed to the underside of the heat absorption sheet, combined with an air flow system through the cavity. Whenever a flow of air, to initiate a cooling cycle of operation, is directed through the cavity, the water being sprayed commences to evaporate to cool the air and the water within the cavity. The cooled water flows from the cavity in the same manner as heated water flows therefrom when the air flow system is inoperative. It was found that even though solar energy would be directed into the collector during a cooling cycle, the cooling effect from evaporation of water would overwhelm the heating effect of the solar energy. Thus, aside from the air flow system, no special arrangements or mechanisms are needed to adapt collectors for the dual functions of heating and cooling.

It follows that an object of the invention is to provide a novel and improved solar radiation collector which can also function as a water cooler and thereby eliminate expensive structures such as cooling towers.

Other objects of the invention are to provide a novel and improved solar radiation collector which can also function as a water cooler, and which: is especially suited for reversible heat pump installations to heat or cool a house; may also be used directly for heating or cooling a house, especially in desert areas where low humidity of the air produces a drastic cooling effect; adds a new dimension to the solar heating art; and provides a simple, economical, maintenance free, reliable system.

With the foregoing and other objects in view, my present invention comprises certain constructions, combinations and arrangements of parts and elements, as hereinafter described, defined in the appended claims and illustrated in preferred embodiments in the accompanying drawings in which:

FIG. 1 is an isometric view of a modular solar energy collector unit having piping connections attached thereto including air duct portions for converting the unit into a water cooler.

FIG. 2 is a longitudinal sectional view of the collector unit as taken from the indicated line 2—2 at FIG. 1 but on an enlarged scale, at an inclination, and with the center portion broken away to conserve space.

FIG. 3 is a transverse sectional view of the collector unit as taken from the indicated line 3—3 at FIG. 2, but on a further enlarged scale.

Figure 6:
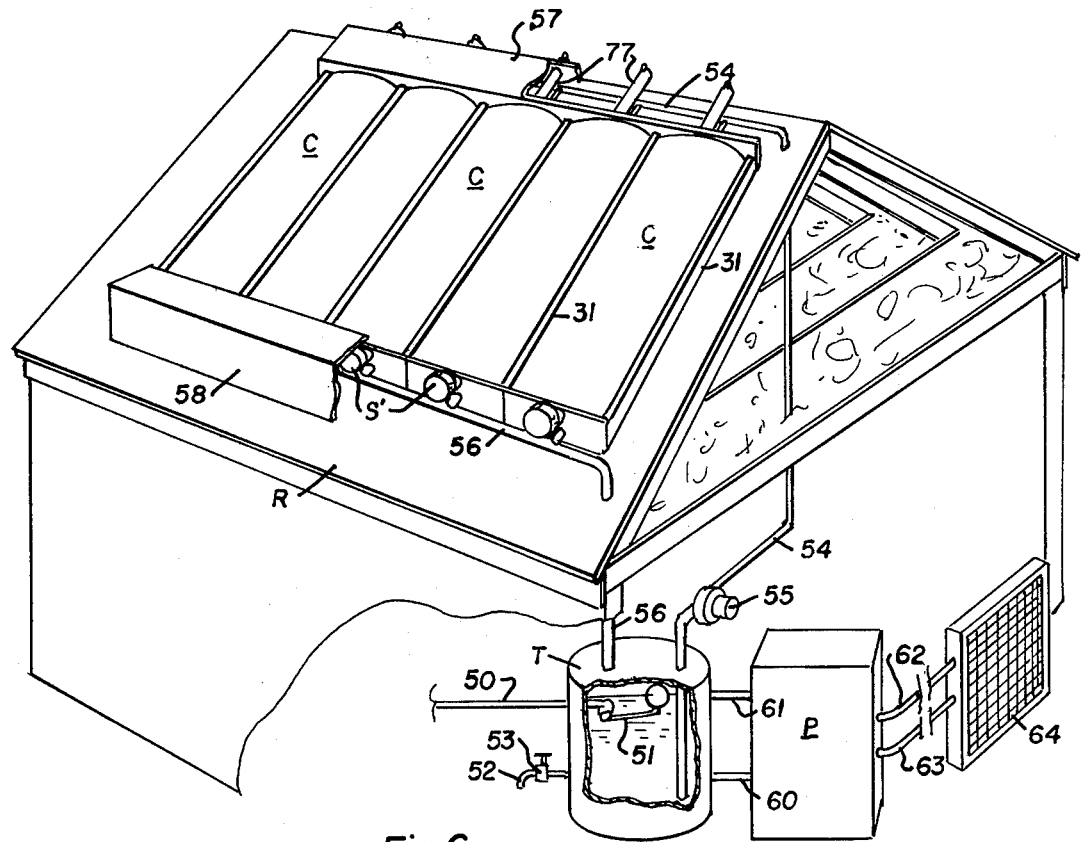

FIG. 6 is a partial, perspective view of a building with a group of modular collector units mounted upon the roof to function as a combined solar energy collector and water cooler-system, and with the walls of the building broken away to show, in a diagrammatic manner, several components, including a heat pump, within the building which uses the heated or cooled water from the collector system to heat or cool the interior of the building.

Figure 7:
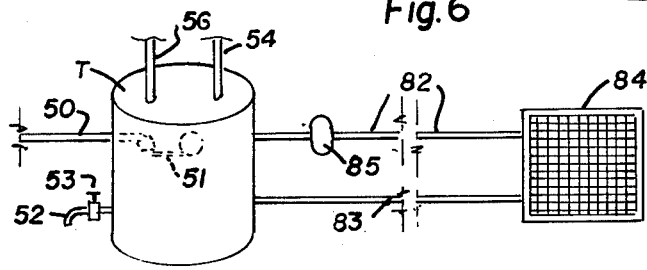

FIG. 7 is a fragmentary, diagrammatic view of components which may be associated with the collector system to use the heated and cooled water directly.

Referring more particularly to the drawing, a preferred type of a collector unit C which may be used in the present invention is described in my pending application, Ser. No. 759,762. However, it is to be understood that this is not restrictive because other spray type solar units can also be modified to incorporate therein the present invention, for example, a structure disclosed in my patent, U.S. Pat. No. 4,003,365, could be so modified.

Figure 4:
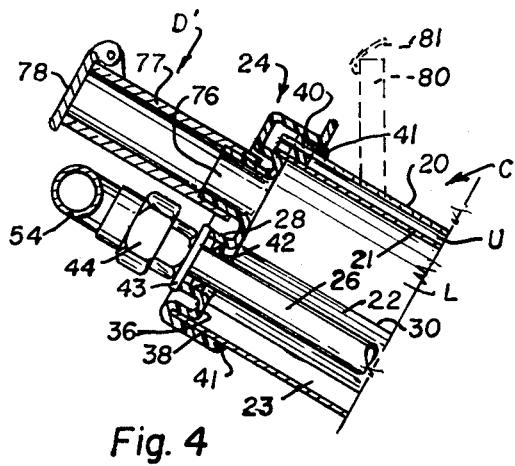
FIG. 4 is a fragmentary longitudinal sectional view, similar to FIG. 2 but showing only the upper end of the unit, with a modified arrangement of an air duct.
Figure 5:
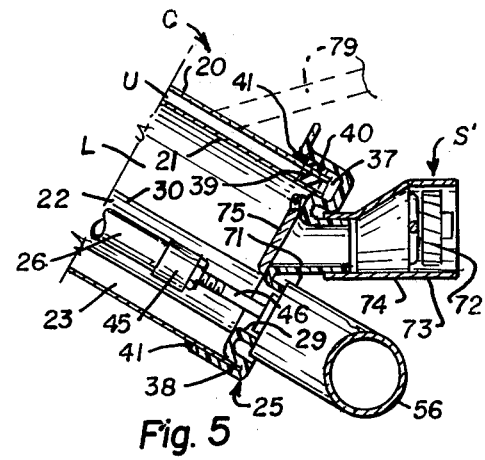
FIG. 5 is a fragmentary longitudinal sectional view, similar to FIG. 2 but showing only the lower end of the unit, with a modified arrangement of an air duct.

As best illustrated at FIGS. 1, 2 and 3, the collector C is a comparatively flat, elongated unit, rectangular in plan. In use it will be longitudinally tilted as shown at FIG. 2, or at a steeper pitch to define an upper end and a lower end. The upper surface of this collector C, which is exposed to solar radiation, is a transparent radiation transmission sheet 20. A short distance below the radiation transmission sheet is an opaque, a radiation absorption sheet 21. Both of these sheets are formed as transversely, upwardly-arched, cylindrical segments as illustrated. A narrow upper cavity U is thus formed between them. The longitudinal edges of the sheet 21 join with the edges of a pan 22 forming the undersurface or bottom of the unit. The pan is trough-like in section with opposite side portions extending downwardly from their respective side edges and to a longitudinally extended gutter 23 as best shown at FIG. 3. Thus, an enlarged lower cavity L is formed between the absorption sheet and the pan. Water dropping from the underside of the absorption sheet 21 and falling onto the pan 22 will flow to the gutter and thence to the lower end of the unit. The ends of the unit are closed by an upper end cap 24 and a lower end cap 25. A water conduit 26 having nozzles 27 extends through the lower cavity and through an opening 28 in the upper end cap 24. A drainage opening 29 is provided in the lower end cap 25. To complete this collector, the water cooler components, which are air ducts, are provided. FIGS. 1, 2 and 3 show an air supply duct S and an air discharge duct D which are connected to the pan 22 near the bottom and top, respectively, of the collector. FIGS. 4, 5 and 6 show a modified air supply duct S' and a modified air discharge duct D' which are connected to the lower and upper end caps 24 and 25, respectively. Further details of the collector and of the air ducts are now described in more detail.

The materials forming the collector may vary. The transmission sheet 20 is of a clear resin material such as polycarbonate or it may be of glass or a number of other resins. The heat absorption sheet 21 is an opaque water resistant material having its upper surface suitably blackened to absorb solar radiation. A metal such as copper sheeting is preferred. The pan 22 is of similar material. The longitudinal edges of the sheets 20 and 21 and the pan 22 may be joined together, in any suitable manner as by folding, as described in my prior application. Another mode of joining is shown at FIG. 3 where the longitudinal edges of the absorption sheet 21 and the pan 22 are placed together as at laps 30 and sealed by solder, adhesive folds or the like, it being essential that the lap 30 be watertight. The lap 30 may be mounted upon any suitable support strip 31 and the support strip, which may be folded metal or a solid block, will include a socket 32 to hold the longitudinal edge of the transmission sheet 20. The spacing of the transmission sheet 20 from the absorption sheet 21 prevents damage to the transmission sheet if the absorption sheet becomes overheated. A suitable sealant is provided at socket 32 to weather-protect the transmission sheet 20 as from moisture.

The upper and lower end caps 24 and 25 are made of rigid water resistant material, and preferably a formable material such as a plastic resin which may be cast, molded or pressure formed. The basic structure of each end cap consists of a rectangular panel 36 having an upper edge socket 37 and a pan socket 38 in the face of the panel. These sockets conform to and receive the transverse ends to the transmission and absorption sheets and the pan and the sockets join at the sides of each end where the sheet and pan edges come together. Each upper socket is proportioned to receive the edges of the spaced-apart transmission and absorption sheets and to include a suitable spacer tape 39 between the sheets 20 and 21 and a sealer tape 40 is at the outer edge of the transmission sheet 20. A sealant 41 such as silicon rubber is applied to the edges of the sockets to make the system watertight.

The pipe opening 28 and the drainage opening 29 in the upper and lower end caps 24 and 25, are located at the center of their respective end caps adjacent to the gutter 23 at the bottom of the pan. Each opening is flanged to form a short tube to better mount the conduit 26 in the opening 28 and to permit a drain to be attached to the drain opening 29. The conduit 26 extended through the opening 28 is held in place by a sealing O-ring 42 fitted in the opening 28 with a flat washer 43 abutted against a pipe fitting 44 on the pipe 26 and against the outer end of the tubular opening. The opposite end of the conduit is adjacent to the drain opening 29. This end is closed by a cap 45 and an axially centered rod 46 extends into the opening 29 to hold a strainer cup 48 in the opening. A wing nut, not shown, holds the assembly in place.

One typical, basic mode of mounting collector-units upon a building is shown at FIG. 6. The collectors C are in a side-by-side array on a roof R. The water which is circulated through these units is supplied from a tank T, within the building, which will normally be insulated. A water supply line 50 to this tank is controlled by a float valve 51 to keep a constant level in the tank. A water drain 52 with either a manual or automatic valve 53 may be used to change water in the tank as hereinafter described. A feed line 54 extends from the tank T to manifold connect with the water conduits 26 of the collector units C on the roof. A pump 55 provides sufficient pressure in line 54 to lift the water and assure a spray action at the nozzles 27. A return line 56 is manifold to the discharge openings 29 of each collector unit C and the return water flows by gravity into the tank T. To complete this arrangement, suitable insulating covers 57 and 58 at the top and bottom of the array of collectors, protects the ends of the collectors and the feed line 54 and return line 56 from weather and cold. Also, the underside of the collectors will be insulated as at 59, FIG. 3, to minimize heat losses in cold weather.

Supplementing this basic arrangement, a heat pump P connects with the tank T by a cold water bottom pipe 60 and a hot water upper pipe 61, since the water in the tank T will stratify. The heat pump P includes another fluid system having an outlet line 62 and a return line 63 extending to a service radiator 64 or any other suitable arrangement for radiating heat energy. The operation of the heat pump to provide heat energy at the service radiator 64 will include taking a flow of hot water from the tank T, through the upper pipe 61 and return chilled water to the tank T through bottom pipe 60. The pump, through conventional operations with conventional controls which need not be shown, then provides a flow of hot fluid to the service radiator, at a temperature which can be considerably hotter than the water supplied to the tank T from the collectors.

To reverse the heat pump, cooled water from the tank T flows through the bottom pipe 60 and hot water is returned to the tank through the upper pipe 61. The pump, through conventional operations, will then provide a flow of cold fluid to the service radiator, at a temperature which can be considerably colder than the water in the tank T.

The heating operation by the collectors C is effected by the arrangements above described, the spray of water in the lower cavity L of each collector being heated by its contact with the heat absorption sheet 21. Without air circulation in this lower cavity, the humidity is 100 percent and all heat generated therein, aside from minor heat losses, is directed towards warming the spray water.

A movement of air into and through the lower cavity, however, will change the entire operation of the collector. The dominant action is then evaporation of water at a rate which is determined by the humidity of air moving into the cavity, which is usually considerably less than 100 percent, with an attendant cooling of the air and the water being sprayed therein. This action is similar to the spray coolers used in some types of cooling towers and is quite effective. Actually the evaporation action will cool the air in the cavity so rapidly that the solar energy heating effect against the absorption sheet 21 is overwhelmed. The air supply duct S and the air discharge duct D, connected to the pan 22, are provided to take advantage of this cooling action.

The air supply duct S includes a manifold supply pipe 65 to provide an air flow to each collector unit C in the installation. The air supply is from any suitable conventional blower which is not shown. As shown in FIGS. 2 and 3, a pipe branch 66 extends from the supply pipe 65 to an opening 67 in the pan 22 at a point near the bottom of the sloping collector and at one side of the trough 23. The air discharge duct D is a short pipe 68 which extends from an opening 69 in the pan 22 at a point near the top of the sloping collector to exhaust air to the atmosphere. The air flow from the supply pipe 65 through the branch 66 and from the pipe 68 provides movement of air through the collector for the aforestated cooling action.

It is to be noted that the slope of the branch 66 and the pipe 68 with respect to the slope of the collector must be such that any moisture falling into the openings 67 and 69, in the pan, will flow from the branches and into the cavity. This is not a serious problem, however, since the collectors will ordinarily be set from 45 to 60 degrees from the horizontal to be normal to the altitude of the sun in the wintertime when the sun is at its maximum southerly position.

Another consideration is the fact that the passageway through the cavity must be cut off when it is desired to heat and it is contemplated that a check valve 70 will be placed at the exit of the pipe 68 to accomplish this purpose. Also, if desired, other valves may be placed in the ducts to assure a complete closure.

The alternate arrangement of the air supply duct S' and the air discharge duct D' provides for air entry through the lower end cap 25 and discharge through the upper end cap 24 as shown at FIGS. 4, 5 and 6.

The supply duct D' is connected to a nipple 71 in the end cap which may be above the outlet flange 29, as shown, or at the side of this flange. The nipple will turn upwardly from this end cap at an angle which corresponds with the slope at which the collector will be placed to assure drainage of water falling therein back into the cavity and to the pan. An alternate air supply may be furnished through the duct D' by a small and compact axial duct fan 72 with the fan housing 73 being sized by a converging section 74 to fit upon the nipple 71. Because the section is short, a flap valve 75 is provided to close off the supply duct S' when it is not used.

The discharge duct D' is mounted upon a nipple 76 at the upper end cap 24 and a short reach of pipe 77 is fitted upon the nipple with a flap valve 78 to close it off when the duct is not used. As aforementioned, the cooling effect of the air flow will normally overwhelm the heating effect of the absorption sheet 21 whereagainst the water spray is directed. However, where high humidity of the air will prevent a most effective cooling action, it may be desirable to minimize this heating effect to the transmission sheet 21. Covering the solar collectors is usually impractical because when located on a roof, they will normally be inaccessible. However, it was found that a flow of air in the upper cavity U, between the heat transmission sheet 20 and the heat absorption sheet 21, would effectively reduce this undesired, added heat. Any suitable auxiliary air blowing system may be used and, as indicated in broken lines at FIGS. 4 and 5, a supply conduit 79 and exhaust conduit 80 may be attached to and extend through the heat transmission sheet 20 at opposite ends of the collector. The exhaust conduit will be provided with a suitable check valve 81 and the supply conduit will be provided with a suitable filter, not shown, to prevent dust from collecting in the cavity.

Operation of the system for cooling can be obtained with the components above described by properly setting the heat pump for cooling and activating the blowers. The controls to accomplish this are not shown since they are quite conventional.

In a high desert country where the humidity is very low, the cooling action as described, can be very effective without the need for a heat pump and FIG. 7 shows a simplified arrangement of the tank T with an upper hot water line 82 and a lower cold water line 83 extending directly to a service radiator 84. A reversible pump 85 is placed in the hot water line to flow either hot or cool water to the radiator 84 depending on whether the collectors are operating on a heating or a cooling cycle.

The evaporation of water in some parts of the country can create scaling problems when large amounts of dissolved solids are present, and in every instance and especially in such cases, the system must be drained to prevent the salt concentration from causing precipitation and scaling. The control valve 53 of the drain may be opened to provide a continuous small loss of water to accomplish this purpose. The flow can be determined by simple determinations of dissolved solids in the water.

I have now described my invention in considerable detail. It is obvious, however, that others skilled in the art can devise and build alternate and equivalent constructions which are within the scope and spirit of my invention. Hence, I desire that my protection be limited, not by the constructions illustrated and described, but only by the proper scope of the appended claims.

What is claimed is:

1. A solar radiation collector and water cooling unit, comprising:
   (a) an upper, outer radiation transmission surface oriented to receive and transmit radient solar rays;
   (b) an intermediate radiation absorption surface spaced below said upper surface to receive and absorb said transmitted solar rays and convert the same to heat;
   (c) a lower drainage surface, with an outlet, spaced below said intermediate surface;
   (d) side and end connection means interconnecting the sides and ends of said upper, intermediate and lower surfaces to define an upper cavity between the said upper and intermediate surfaces and a lower cavity between the said intermediate and lower surfaces;
   (e) a spray means within said lower cavity adapted to spray water against the underside of said intermediate surface, to fall to the lower drainage surface and to flow from said outlet; and
   (f) an air-flow means having an air duct means to said lower cavity, to selectively pass or prevent a flow of air through the lower cavity, whereby to cool water from the spray means whenever air flows through the lower cavity or permit solar radiation to heat water from the spray means whenever air is prevented from flowing through the lower cavity.

2. The unit defined in claim 1, including:
   a second air-flow means having an air duct means to said upper cavity, to pass a flow of air through the upper cavity whenever a flow of air is being passed through the lower cavity whereby to reduce the heat of solar radiation being absorbed by said intermediate surface.

3. The unit defined in claim 2, wherein said second air flow duct means connects with the first mentioned airflow duct means to receive the cooled air discharge from the lower cavity.

4. The unit defined in claim 1, including further:
   (a) a heat utility means adapted to selectively function for heating when provided a supply of heated water and for cooling when provided a supply of cooled water; and
   (b) a conduit from said outlet to the heat utility means whereby the heat utility means is selectively provided with heated water and cooled water.

5. The unit defined in claim 4 wherein said heat utility means includes a heat pump.

6. The unit defined in claim 4 wherein said heat utility means includes:
   (a) a storage tank having an inlet means to retain water in the tank to a selected level;
   (b) a supply line, including a pump means, connecting with said spray means extending from the storage tank;
   (c) a return line extending from said outlet to the tank to receive water from the outlet;
   (d) a pair of outlet-inlet circulation pipes from the tank with a lower pipe being positioned near the bottom of the tank and an upper pipe being positioned near the aforesaid water level; and
   (e) means to selectively draw or return warmer water from the tank through the upper pipe and return or draw cold water to the tank through the lower pipe.

7. The unit defined in claim 6, including a valve-controlled drain from the tank to permit a slow change of water therein.

8. A modular solar radiation collector unit and water cooling unit adapted to be mounted at an inclination including the vertical to better receive radiant solar rays and to permit gravity drainage of water from the bottom end of the unit when so inclined, comprising:
   (a) an upper, outer radiation transmission surface;
   (b) an intermediate radiation absorption surface which is spaced below the upper radiation transmission surface to define an upper cavity therebetween;
   (c) a lower surface including a drainage pan which is spaced below the radiation absorption surface to define a lower cavity therebetween;
   (d) a side connection means interconnecting the longitudinal inclined side edges of the upper, intermediate and lower surfaces;
   (e) top and bottom end cap means interconnecting the transverse top and bottom ends of the upper, intermediate and lower inclined surfaces whereby the side connection means and top and bottom end cap means enclose the upper and lower cavities between the respective surfaces;
   (f) a spray means extended into the lower cavity to spray fluid against the underside of the radiation absorption surface;
   (g) a drainage outlet means at the bottom of the lower cavity; and
   (h) an air flow means, including an air duct to the lower cavity near the bottom of the unit and a second air duct to the lower cavity near the top of the unit to selectively pass or prevent a flow of air through the lower cavity, from one end to the other, whereby to cool water from the spray means whenever air flows through the cavity or permit solar radiation to heat water from the spray means whenever air is prevented from flowing through the lower cavity.

9. The unit defined in claim 8 including a check valve means associated with the air ducts to close at least one of the ducts whenever air is not flowing through the lower cavity.

10. The unit defined in claim 8 wherein at least one of the ducts connects with the drainage pan and is inclined, with respect to the inclination of the unit, to prevent a backflow of water from the cavity and into the duct.

11. The unit defined in claim 8 wherein at least one of the ducts connects with an end cap means and is inclined with respect to the inclination of the unit to prevent a backflow of water from the cavity and into the duct.

12. The unit defined in claim 8 including a second air-flow means, including an auxiliary air duct to the upper cavity near the bottom of the unit and a second auxiliary duct to the upper cavity near the top of the unit, to pass an air flow through the upper cavity whenever air is flowing through the lower cavity.

* * * * *